United States Patent
Park et al.

(10) Patent No.: US 12,086,505 B2
(45) Date of Patent: Sep. 10, 2024

(54) METHOD OF MANUFACTURING SEMICONDUCTOR FABRICATION SYSTEM

(71) Applicant: Samsung Electronics Co., Ltd., Suwon-si (KR)

(72) Inventors: Seora Park, Suwon-si (KR); Jungsik Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/117,857

(22) Filed: Mar. 6, 2023

(65) Prior Publication Data
US 2023/0306146 A1    Sep. 28, 2023

(30) Foreign Application Priority Data
Mar. 22, 2022    (KR) .................. 10-2022-0035199

(51) Int. Cl.
| | | |
|---|---|---|
| H01L 21/67 | (2006.01) | |
| G06F 30/10 | (2020.01) | |
| G06F 113/14 | (2020.01) | |

(52) U.S. Cl.
CPC ........ *G06F 30/10* (2020.01); *H01L 21/67034* (2013.01); *H01L 21/67063* (2013.01); *G06F 2113/14* (2020.01)

(58) Field of Classification Search
CPC ......... H01L 21/67034; H01L 21/67063; H01L 21/67017; H01L 21/67155; H01L 21/67011; G06F 2113/14; F04C 25/02; H01J 37/32844; Y02P 70/50
See application file for complete search history.

(56) References Cited

U.S. PATENT DOCUMENTS

| | | |
|---|---|---|
| 7,532,952 B2 | 5/2009 | Curry et al. |
| 8,026,113 B2 | 9/2011 | Kaushal et al. |
| 11,353,023 B2 | 6/2022 | Lee |
| (Continued) | | |

FOREIGN PATENT DOCUMENTS

| | | |
|---|---|---|
| JP | 2003-083248 A | 3/2003 |
| JP | 2004-131760 A | 4/2004 |
| (Continued) | | |

OTHER PUBLICATIONS

English translation of KR20190080505 (Year: 2019).*
English translation of KR20220021794 (Year: 2022).*

*Primary Examiner* — Jun S Yoo
(74) *Attorney, Agent, or Firm* — Muir Patent Law, PLLC

(57) ABSTRACT

A method of manufacturing a semiconductor fabrication system may include preparing a first vacuum pipe, preparing a second vacuum pipe, connecting a first process chamber to a first pump through the first vacuum pipe, and connecting a second process chamber, which is spaced apart from the first process chamber, to a second pump through the second vacuum pipe. The preparing of the first vacuum pipe may include connecting a plurality of first unit pipes to form the first vacuum pipe and calculating a first conductance, which is a total conductance of the first vacuum pipe. The preparing of the second vacuum pipe may include forming the second vacuum pipe by connecting a plurality of second unit pipes such that the second conductance, which is a total conductance of the second vacuum pipe, is equal to the first conductance.

19 Claims, 10 Drawing Sheets

(56) References Cited

U.S. PATENT DOCUMENTS

2001/0012697 A1    8/2001   Mikata
2020/0248305 A1    8/2020   Motoyama et al.

FOREIGN PATENT DOCUMENTS

| JP | 4549004 | B2 | | 9/2010 | |
|---|---|---|---|---|---|
| JP | 2015-059440 | A | | 3/2015 | |
| JP | 6268469 | B2 | | 1/2018 | |
| JP | 6729317 | B2 | | 7/2020 | |
| KR | 20-0437830 | Y1 | | 1/2008 | |
| KR | 10-1926658 | B1 | | 12/2018 | |
| KR | 10-2019-0080505 | A | | 7/2019 | |
| KR | 2019080505 | A | * | 7/2019 | ............ H01J 37/321 |
| KR | 10-2022-0021794 | A | | 2/2022 | |
| KR | 2022021794 | A | * | 2/2022 | |

* cited by examiner

| Parts | # | | Conductance(m³/s) |
|---|---|---|---|
| Pipe | Φ(mm) | L(mm) | |
| | 40 | 1000 | C1 |
| | 40 | 500 | C2 |
| | 40 | 1500 | C3 |
| | 125 | 7500 | C4 |
| Elbow | Φ(mm) | α(°) | |
| | 40 | 45 | C5 |
| | 100 | 90 | C6 |
| Reducer | D1(mm) | D2(mm) | |
| | 40 | 100 | C7 |
| | 100 | 125 | C8 |

METHOD OF MANUFACTURING SEMICONDUCTOR FABRICATION SYSTEM

CROSS-REFERENCE TO RELATED APPLICATIONS

This U.S. non-provisional patent application claims priority under 35 U.S.C. § 119 to Korean Patent Application No. 10-2022-0035199, filed on Mar. 22, 2022, in the Korean Intellectual Property Office, the entire contents of which are hereby incorporated by reference.

BACKGROUND OF THE INVENTION

The present disclosure relates to a method of manufacturing a semiconductor fabrication system, and in particular, to a method of improving uniformity in performance between systems.

A semiconductor device is fabricated through various processes. For example, the fabrication of the semiconductor device may include a photolithography process, an etching process, a deposition process, a polishing process, and a cleaning process, which are performed on a wafer (e.g., a silicon wafer). Some of the processes are performed under a vacuum condition. For the vacuum condition, a pump is connected to a process chamber. A vacuum pipe connecting the process chamber to the pump is used to exert a vacuum pressure, which is produced by the pump, on the process chamber.

SUMMARY

An embodiment of the inventive concept provides a system manufacturing method capable of improving uniformity in performance between a plurality of process chambers, which are used to perform the same process with the same recipe.

An embodiment of the inventive concept provides a system manufacturing method capable of easily controlling a plurality of process chambers.

An embodiment of the inventive concept provides a system manufacturing method capable of reducing a performance variation between process chambers and thereby improving a fabrication yield of a semiconductor device.

An embodiment of the inventive concept provides a system manufacturing method, allowing for free disposition of a process chamber and/or a pump.

According to an embodiment of the inventive concept, a method of manufacturing a semiconductor fabrication system may include preparing a first vacuum pipe, preparing a second vacuum pipe, connecting a first process chamber to a first pump through the first vacuum pipe, and connecting a second process chamber, which is spaced apart from the first process chamber, to a second pump through the second vacuum pipe. The preparing of the first vacuum pipe may include connecting a plurality of first unit pipes to form the first vacuum pipe and calculating a first conductance, which is a total conductance of the first vacuum pipe. The preparing of the second vacuum pipe may include forming the second vacuum pipe by connecting a plurality of second unit pipes such that the second conductance, which is a total conductance of the second vacuum pipe, is equal to the first conductance.

According to an embodiment of the inventive concept, a method of manufacturing a semiconductor fabrication system may include preparing a plurality of vacuum pipes and connecting each of a plurality of process chambers to a corresponding one of a plurality of pumps through a corresponding one of the vacuum pipes. The preparing of the vacuum pipes may include calculating a conductance of each of the vacuum pipes, and all of the vacuum pipes may have substantially the same conductance.

According to an embodiment of the inventive concept, a method of manufacturing a semiconductor fabrication system may include preparing a first vacuum pipe, preparing a second vacuum pipe, which is spaced apart from the first vacuum pipe and has a different shape from the first vacuum pipe, connecting a first process chamber to a first pump through the first vacuum pipe, and connecting a second process chamber to a second pump through the second vacuum pipe. The preparing of the first vacuum pipe may include calculating a first conductance, which is a total conductance of the first vacuum pipe. The preparing of the second vacuum pipe may include forming the second vacuum pipe such that a second conductance, which is a total conductance of the second vacuum pipe, is equal to the first conductance.

BRIEF DESCRIPTION OF THE DRAWINGS

FIG. 10 is a table showing unit data obtained during manufacturing a semiconductor fabrication system according to an embodiment of the inventive concept.

DETAILED DESCRIPTION

Figure 1:
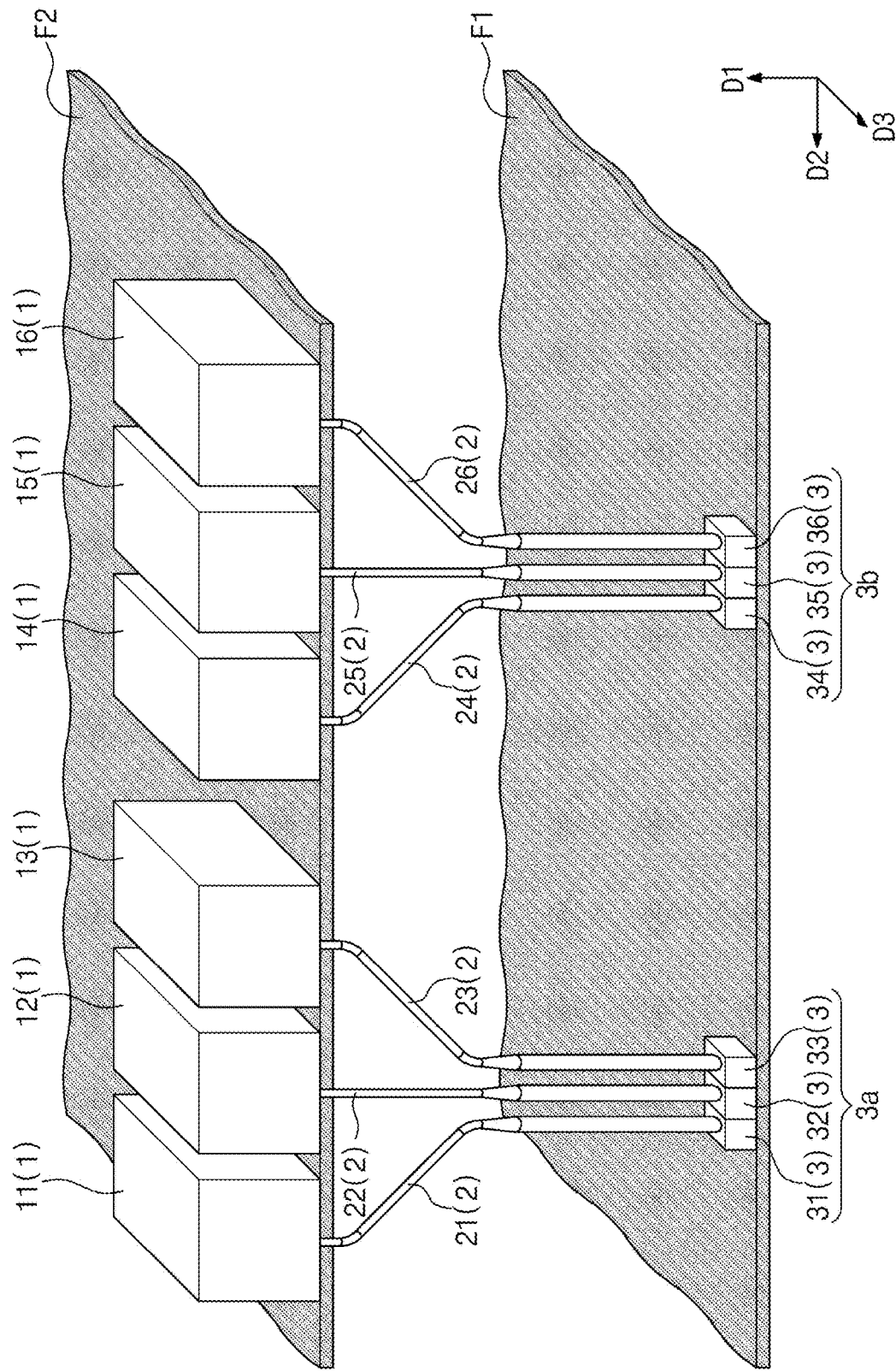
FIG. 1 is a perspective view illustrating a semiconductor fabrication system according to an embodiment of the inventive concept.

Example embodiments of the inventive concepts will now be described more fully with reference to the accompanying drawings, in which example embodiments are shown. Like reference numerals in the drawings denote like elements, and thus their duplicated description will be omitted.

FIG. 1 is a perspective view illustrating a semiconductor fabrication system according to an embodiment of the inventive concept.

In the present application, as shown in FIG. 1, the reference numbers D1, D2, and D3 will be used to denote a first direction, a second direction, and a third direction, respectively, which are not parallel to each other. For example, the first, second, and third directions D1, D2, and D3 may be perpendicular to each other.

Referring to FIG. 1, a semiconductor fabrication system may be provided. The semiconductor fabrication system may be configured to perform a fabrication process on a substrate. For example, the semiconductor fabrication system may be a system, which is configured to perform an etching process, a deposition process, a cleaning process, or an exposure process on the substrate. For example, the semiconductor fabrication system may include an etching chamber, a deposition chamber, a cleaning chamber, a drying chamber, or an exposure chamber for processing the substrate. The substrate may be a silicon substrate, which is provided in the form of a wafer, but the inventive concept is not limited to this example. For performing a process on the substrate, the semiconductor fabrication system may include a process chamber 1, a pump 3, and a vacuum pipe 2.

In an embodiment, a plurality of process chambers 1 may be provided. For example, a first process chamber 11, a second process chamber 12, a third process chamber 13, a fourth process chamber 14, a fifth process chamber 15, and a sixth process chamber 16 may be provided, as shown in FIG. 1. The process chambers 1 may be provided to be spaced apart from each other. FIG. 1 illustrates an example in which the process chambers 1 are spaced apart from each other in a horizontal direction (in the second direction D2), but the inventive concept is not limited to this example. For example, although not shown in FIG. 1, the process chambers 1 may be spaced apart from each other in a vertical direction (e.g., in the first direction D1) and/or in the third direction D3. All of the process chambers 1 may be configured to perform the same process. For example, all of the process chambers 1 may be configured to perform an etching process. In example embodiments, processes, which are performed within the process chambers 1, may be performed with the same recipe. For example, all of the process chambers 1 may be configured to perform the same process with the same recipe. This will be described in more detail below. In order to reduce complexity in the description, one of the process chambers 1 will be described exemplarily. All of the process chambers 1 may be the same as the described one.

The pump 3 may include or may be a vacuum pump. In an embodiment, a plurality of pumps 3 may be provided. For example, a first pump 31, a second pump 32, a third pump 33, a fourth pump 34, a fifth pump 35, and a sixth pump 36 may be provided, as shown in FIG. 1. In an embodiment, a plurality of pumps 3 may be provided as a collectively-combined single structure. For example, the pumps 3 may be disposed adjacent to each other, and may be combined to form one pump cluster/rack. For example, as shown in FIG. 1, the first pump 31, the second pump 32, and the third pump 33 may be connected to each other to form a first pump cluster/rack 3a, and the fourth pump 34, the fifth pump 35, and the sixth pump 36 may be connected to each other to form a second pump cluster/rack 3b. For example, the first to third pumps 31, 32 and 33 may contact each other, and the fourth to sixth pumps 34, 35 and 36 may contact each other. In certain embodiments, the first to third pumps 31, 32 and 33 may be closely disposed to form a cluster of pumps, and the fourth to sixth pumps 34, 35 and 36 may be closely disposed to form a cluster of pumps. The pumps 3 may be of the same type. For example, all of the pumps 3 may be the same in size and shape. Accordingly, the pumps 3 may be provided to have the same output. For example, when the pumps 3 are under the same condition, the outputs of them may be the same. This will be described in more detail below. In order to reduce complexity in the description, one of the pumps 3 will be described exemplarily. All of the pumps 3 may be the same as the described one.

A process on the substrate may be performed within the process chamber 1. The process on the substrate may be performed under vacuum environment. To achieve the vacuum environment, the pump 3 may be connected to the process chamber 1. For example, the first pump 31 may be connected to the first process chamber 11, and the second pump 32 may be connected to the second process chamber 12. Each of the pumps 3 may be connected to a corresponding one of the process chambers 1 in the afore-described one-to-one manner.

The vacuum pipe 2 may connect the process chamber 1 to the pump 3. In an embodiment, a plurality of vacuum pipes 2 may be provided. For example, a first vacuum pipe 21, a second vacuum pipe 22, a third vacuum pipe 23, a fourth vacuum pipe 24, a fifth vacuum pipe 25, and a sixth vacuum pipe 26 may be provided, as shown in FIG. 1. Each of the vacuum pipes 2 may connect a corresponding one of the process chambers 1 to a corresponding one of the pumps 3. For example, each of the process chambers 1 may be in fluid communication with a corresponding one of the pumps 3 through a corresponding vacuum pipe 2. Each of the vacuum pipes 2 may be formed by connecting a plurality of unit pipes to each other. This will be described in more detail below. In order to reduce complexity in the description, one of the vacuum pipes 2 may be described exemplarily. Features of all of the vacuum pipes 2 may be the same as the described ones unless otherwise indicated in the present disclosure.

The pump 3 may be provided at a level different from that of the process chamber 1. For example, the pump 3 may be placed on a first floor F1. The process chamber 1 may be placed on a second floor F2. For example, the process chamber 1 may be spaced apart from the pump 3 in the first direction D1. Accordingly, the vacuum pipe 2 connecting the pump 3 to the process chamber 1 may vertically extend.

The vacuum pipes 2 may have at least two different shapes. For example, at least one of the vacuum pipes 2 may have a shape that is different from shapes of the others of the vacuum pipes 2. For example, the shape of the first vacuum pipe 21 may be different from the shape of the second vacuum pipe 22. For example, a length of the first vacuum pipe 21 may be larger than a length of the second vacuum pipe 22. Alternatively, the first vacuum pipe 21 and the second vacuum pipe 22 may be different from each other in terms of shape, structure, and/or bending position. However, the first vacuum pipe 21 may have a conductance that is substantially equal or similar to that of the second vacuum pipe 22. This will be described in more detail below.

Terms such as "same," "equal," "planar," or "coplanar," as used herein when referring to orientation, layout, location, shapes, sizes, compositions, amounts, or other measures do not necessarily mean an exactly identical orientation, layout, location, shape, size, composition, amount, or other measure, but are intended to encompass nearly identical orientation, layout, location, shapes, sizes, compositions, amounts, or other measures within acceptable variations that may occur, for example, due to manufacturing processes. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes.

Figure 2:
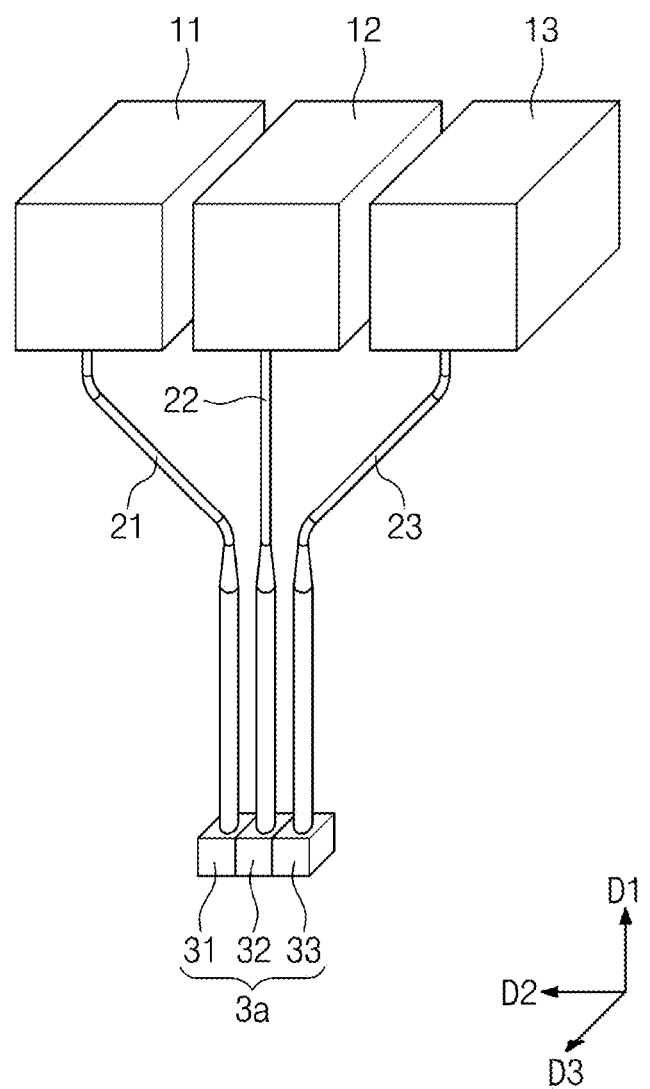
FIG. 2 is a perspective view illustrating a portion of a semiconductor fabrication system according to an embodiment of the inventive concept.
Figure 3:
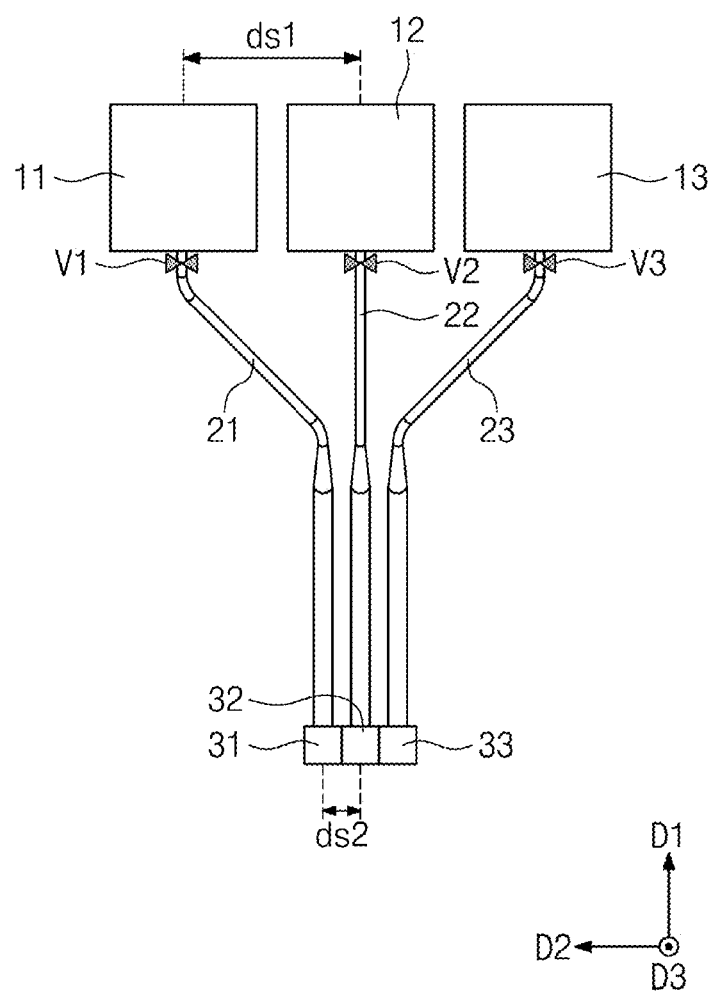
FIG. 3 is a front view illustrating a portion of a semiconductor fabrication system according to an embodiment of the inventive concept.

FIG. 2 is a perspective view illustrating a portion of a semiconductor fabrication system according to an embodiment of the inventive concept, and FIG. 3 is a front view illustrating a portion of a semiconductor fabrication system according to an embodiment of the inventive concept.

Referring to FIGS. 2 and 3, the first and second process chambers 11 and 12 may be spaced apart from each other in a horizontal direction. For example, the first and second process chambers 11 and 12 may be spaced apart from each other by a first distance ds1. A distance between the first and second process chambers 11 and 12 may be a distance between a center of the first process chamber 11 and a center of the second process chamber 12.

The distance between the process chambers may be different from a distance between the pumps. For example, in the first pump cluster/rack 3a, a distance between the first pump 31 and the second pump 32 may be a second distance ds2. The distance between the second pump 32 and the first pump 31 may be a distance between a center of the first pump 31 and a center of the second pump 32. The second distance ds2 may be different from the first distance ds1. For example, the second distance ds2 may be smaller than the first distance ds1.

Since the distance between the process chambers is different from the distance between the pumps, the vacuum pipes connecting the process chambers to the pumps may have at least two different lengths. For example, a shape of the first vacuum pipe 21 may be different from a shape of the second vacuum pipe 22. For example, as shown in FIG. 3, a length of the first vacuum pipe 21 may be larger/longer/greater than a length of the second vacuum pipe 22. However, as described above, the conductance of the first vacuum pipe 21 may be substantially equal or similar to the conductance of the second vacuum pipe 22.

In the present specification, the term "conductance" may mean a flow conductance of a fluid (e.g., fluid conductance). For example, the conductance may be understood as a physical quantity that is generally defined in the field of vacuum technology. In this case, the conductance may be defined as follows:

$$C = \frac{Q}{P_1 - P_2}$$

In the above equation, C represents conductance. The conductance C has the dimension of m³/s. Q represents pressure throughput. The pressure throughput Q has the dimension of Pam³/s. $P_1$ represents pressure at a first position in a pipe. $P_2$ represents pressure at a second position in the pipe. If the shape/design of the pipe is fixed, the conductance of the pipe may be uniquely given. For example, the fluid conductance of the pipe may depend on the shape, size, material, and/or surface texture of the pipe. This will be described in more detail below.

Referring back to FIG. 3, a valve may be combined to each of the vacuum pipes. For example, a first valve V1 may be placed on the first vacuum pipe 21. A second valve V2 may be placed on the second vacuum pipe 22. A third valve V3 may be placed on the third vacuum pipe 23. In order to reduce complexity in the description, one of the valves may be described exemplarily. All of the valves may be the same as the described one unless otherwise indicated in the present disclosure. The valve may be configured to control a flow rate of fluid flowing through a vacuum pipe. For example, when the valve is closed, the fluid in the vacuum pipe may be at rest (e.g., may stop flow). By adjusting an opened extent of the valve, a flow rate of the fluid may be controlled in the vacuum pipe. The valve may include or may be a manual valve. In this case, the opening extent of the valve may be adjusted manually by an operator. However, the inventive concept is not limited to this example, and the valve may include or may be an automatic valve (e.g., a valve controlled by an electrical signal). In certain embodiments, the valve may be a passive valve. This will be described in more detail below.

Figure 4:
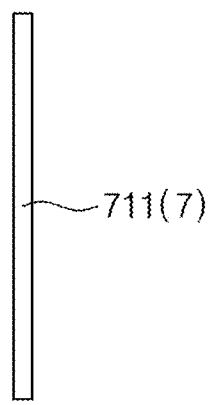
FIG. 4 is an exploded front view illustrating a vacuum pipe according to an embodiment of the inventive concept.
Figure 4:
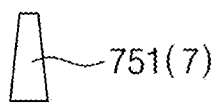
Figure 4:
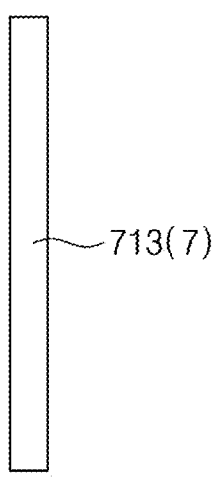
Figure 4:
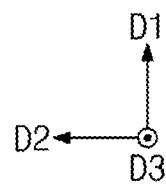
Figure 5:
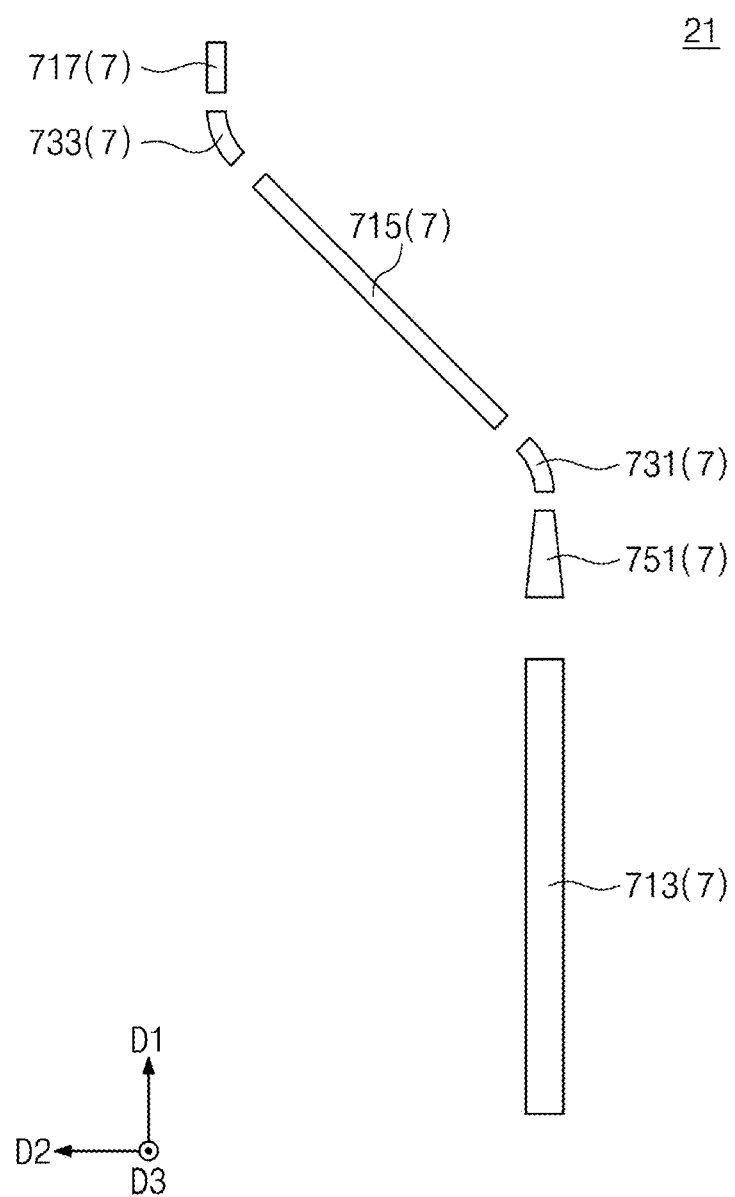
FIG. 5 is an exploded front view illustrating a vacuum pipe according to an embodiment of the inventive concept.

FIG. 4 is an exploded front view illustrating a vacuum pipe according to an embodiment of the inventive concept, and FIG. 5 is an exploded front view illustrating a vacuum pipe according to an embodiment of the inventive concept.

Referring to FIG. 4, the second vacuum pipe 22 may be formed by connecting a plurality of unit pipes 7. For example, a first unit pipe 711, a second unit pipe 751, and a third unit pipe 713 may be connected in series to form one second vacuum pipe 22. Each of the first and third unit pipes 711 and 713 may be a straight pipe. However, a length of the first unit pipe 711 may be different from a length of the third unit pipe 713. In some embodiments, a diameter of the first unit pipe 711 may be different from a diameter of the third unit pipe 713. On the other hand, the second unit pipe 751 may be a reducer pipe. For example, the reducer pipe may reduce the pipe size from a larger bore to a smaller bore. In certain embodiments, eh reducer pipe may be used to increase the pipe size from a smaller bore to a larger bore. For example, both ends of the reducer pipe may have respective bores having different diameters from each other.

Referring to FIG. 5, the first vacuum pipe 21 may be formed by connecting unit pipes 7. For example, a third unit pipe 713, a second unit pipe 751, a sixth unit pipe 731, a seventh unit pipe 715, an eighth unit pipe 733, and a ninth unit pipe 717 may be connected in series to form the first vacuum pipe 21. The third unit pipe 713 and the second unit pipe 751 of the first vacuum pipe 21 may be respectively the same as the third unit pipe 713 and the second unit pipe 751 of the second vacuum pipe 22. Each of the third unit pipe 713, the seventh unit pipe 715, and the ninth unit pipe 717 may be a straight pipe. The second unit pipe 751 may be a reducer pipe. Each of the sixth unit pipe 731 and the eighth unit pipe 733 may be an elbow pipe. For example, the elbow pipe may be a bent pipe configured to be connected two pipes extending different directions from each other.

The conductance may be defined for each of the unit pipes 7. The conductance of each of the unit pipes 7 will be referred to as a unit conductance. The unit conductance of each of the unit pipes 7 may be used to calculate a total conductance of each of the first to sixth vacuum pipes 21, 22, 23, 24, 25 and 26. This will be described in more detail below.

Figure 6:
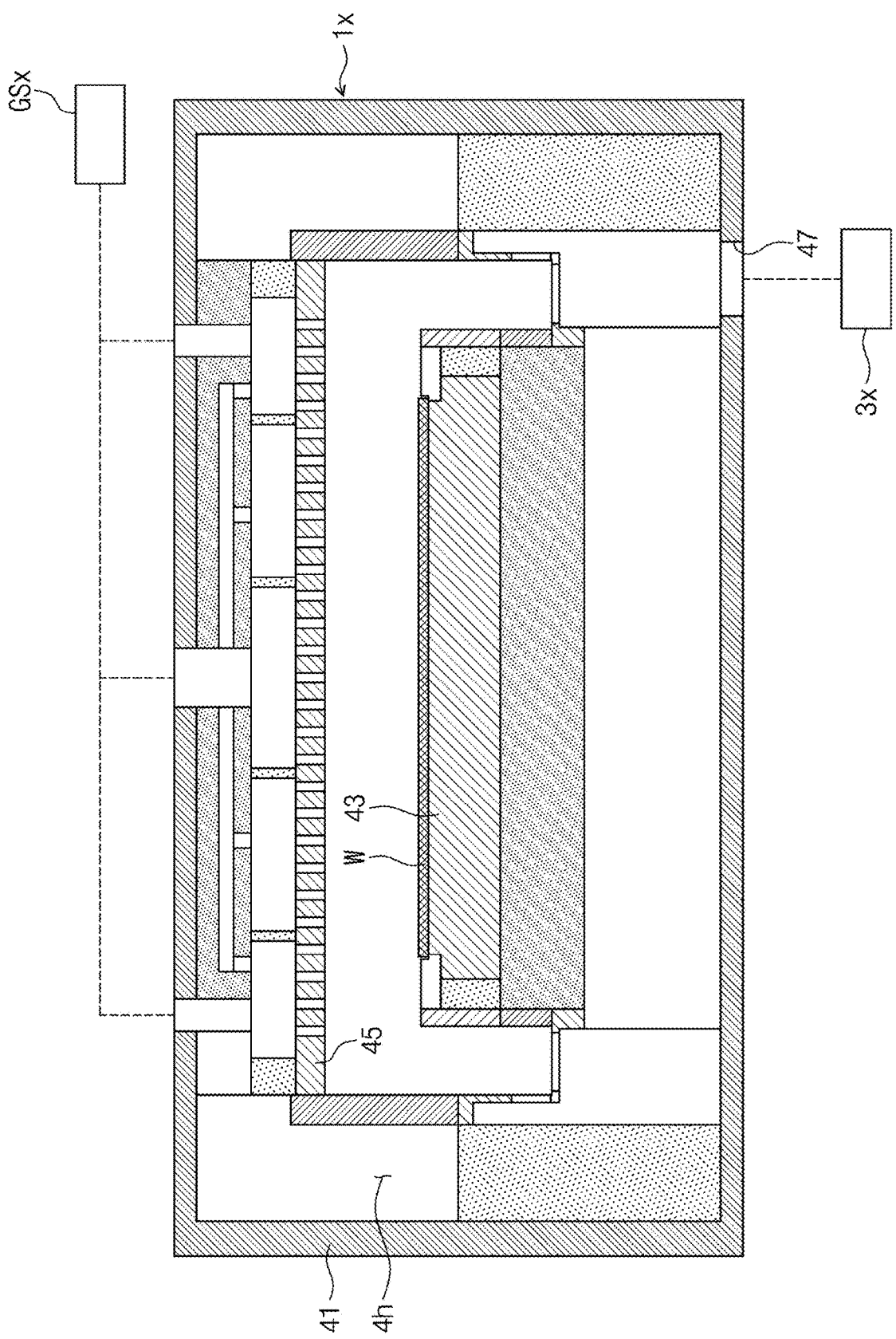
FIG. 6 is a sectional view illustrating an example of a process chamber of a semiconductor fabrication system according to an embodiment of the inventive concept.

FIG. 6 is a sectional view illustrating an example of a process chamber of a semiconductor fabrication system according to an embodiment of the inventive concept.

Referring to FIG. 6, a process chamber 1x may be an example of the process chamber 1 described with reference to FIG. 1. The process chamber 1x of FIG. 6 may be an etching system. In this case, the process chamber 1x may include an etching chamber 41, an electrostatic chuck 43, and a shower head 45. The etching chamber 41 may provide an etching space 4h. The etching space 4h may be connected to a pump 3x through a first exhausting hole 47. A vacuum pressure from the pump 3x may be used to vacuumize the etching space 4h. For example, the pump 3x may be used to achieve a vacuum state in the etching space 4h.

A substrate W may be disposed on the electrostatic chuck 43. A process gas, which is supplied from a first gas supplying part GSx, may be transferred to the etching space 4h through the shower head 45. The process gas may be used in an etching process, which is performed on the substrate W in the etching space 4h, and then may be exhausted to the outside of the etching space 4h through the first exhausting hole 47 by the vacuum pressure formed by the pump 3x. For example, the process gas may be combined with a material disposed on the wafer and the resulted compound may be exhausted through the first exhausting hole 47.

Figure 7:
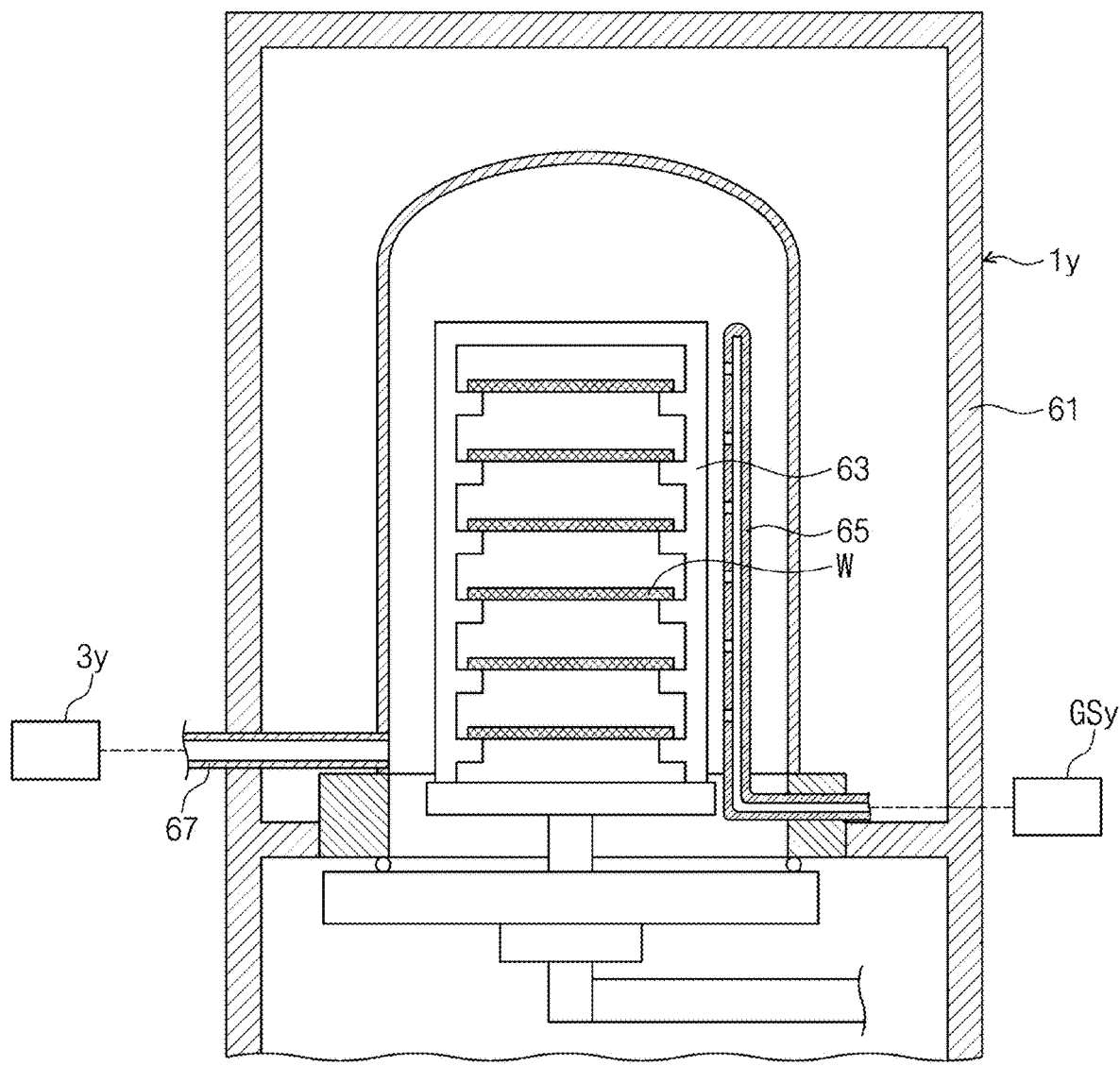
FIG. 7 is a sectional view illustrating an example of a process chamber of a semiconductor fabrication system according to an embodiment of the inventive concept.

FIG. 7 is a sectional view illustrating an example of a process chamber of a semiconductor fabrication system according to an embodiment of the inventive concept.

Referring to FIG. 7, a process chamber 1y may be an example of the process chamber 1 described with reference to FIG. 1. The process chamber 1y of FIG. 7 may include a deposition system. In this case, the process chamber 1y may include a deposition chamber 61, a stage 63, a gas nozzle 65, and a second exhausting hole 67. The gas nozzle 65 may be connected to a second gas supplying part GSy. The gas nozzle 65 may be configured to spray a fluid toward the stage 63. The second exhausting hole 67 may be connected to a pump 3y. A vacuum pressure exerted by the pump 3y may be used to vacuumize an internal space of the deposition chamber 61.

The substrate W may be disposed on the stage 63. For example, the substrates W may be disposed on the stage 63 to be vertically spaced apart from each other. The process gas in the second gas supplying part GSy may be supplied onto the substrate W on the stage 63 through the gas nozzle 65. After a deposition process on the substrate W, the process gas may be exhausted to the outside through the second exhausting hole 67 by a vacuum pressure from the pump 3y. For example, the deposition process may form a layer on the substrate W with the process gas and remainder of the process gas may be exhausted to the outside by the pump 3y.

Figure 8:
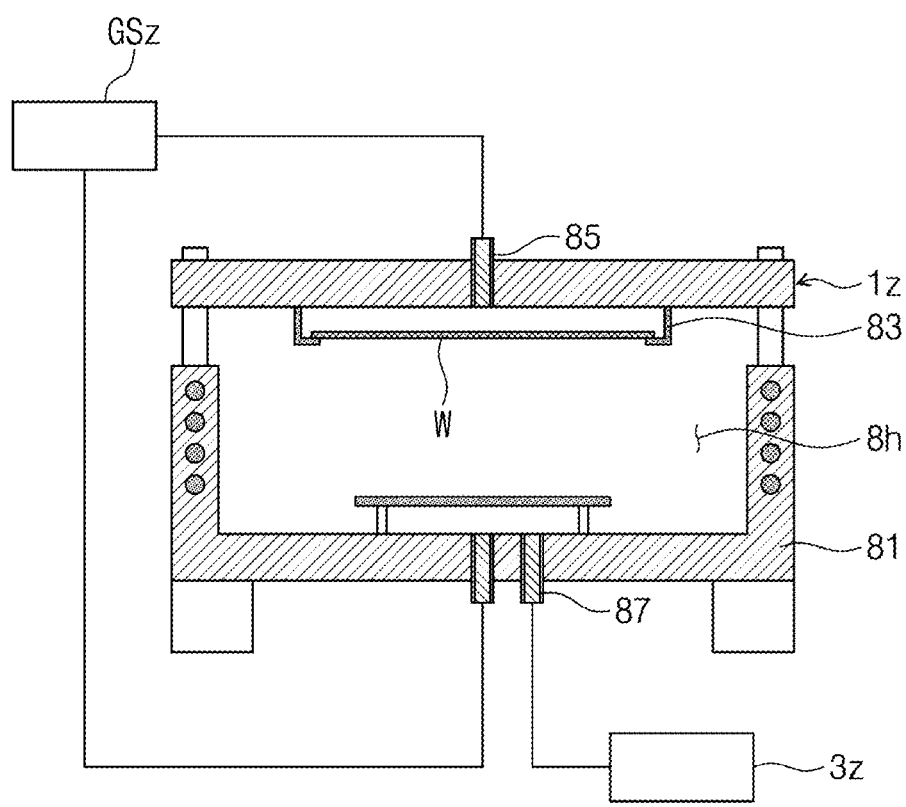
FIG. 8 is a sectional view illustrating an example of a process chamber of a semiconductor fabrication system according to an embodiment of the inventive concept.

FIG. 8 is a sectional view illustrating an example of a process chamber of a semiconductor fabrication system according to an embodiment of the inventive concept.

Referring to FIG. 8, a process chamber 1z may be an example of the process chamber 1 described with reference to FIG. 1. The process chamber 1z of FIG. 8 may include or may be combined with a substrate cleaning system. In this case, the process chamber 1z may include a drying chamber 81, a drying stage 83, a fluid supplying hole 85, and a third exhausting hole 87. In certain embodiments, the substrate cleaning system may include the drying chamber 81 including a drying stage 83, a fluid supplying hole 85, and a third exhausting hole 87. The drying chamber 81 may provide a drying space 8h. The fluid supplying hole 85 may be connected to a drying fluid supplying part GSz. The third exhausting hole 87 may be connected to a pump 3z. A vacuum pressure formed by an operation of the pump 3z may be used to vacuumize the drying space 8h.

The substrate W may be disposed on the drying stage 83. Drying fluid, which is contained in the drying fluid supplying part GSz, may be supplied to the substrate W on the drying stage 83 through the fluid supplying hole 85. The drying fluid may be a supercritical fluid (SCF). For example, the drying fluid may be supercritical carbon dioxide ($CO_2$). After the drying process on the substrate W, the drying fluid may be exhausted to the outside through the third exhausting hole 87 by a vacuum pressure formed by the pump 3z. For example, the drying fluid supplied to a top surface of the substrate may be exhausted from the drying chamber 81 through the third exhausting hole 87.

Figure 9:
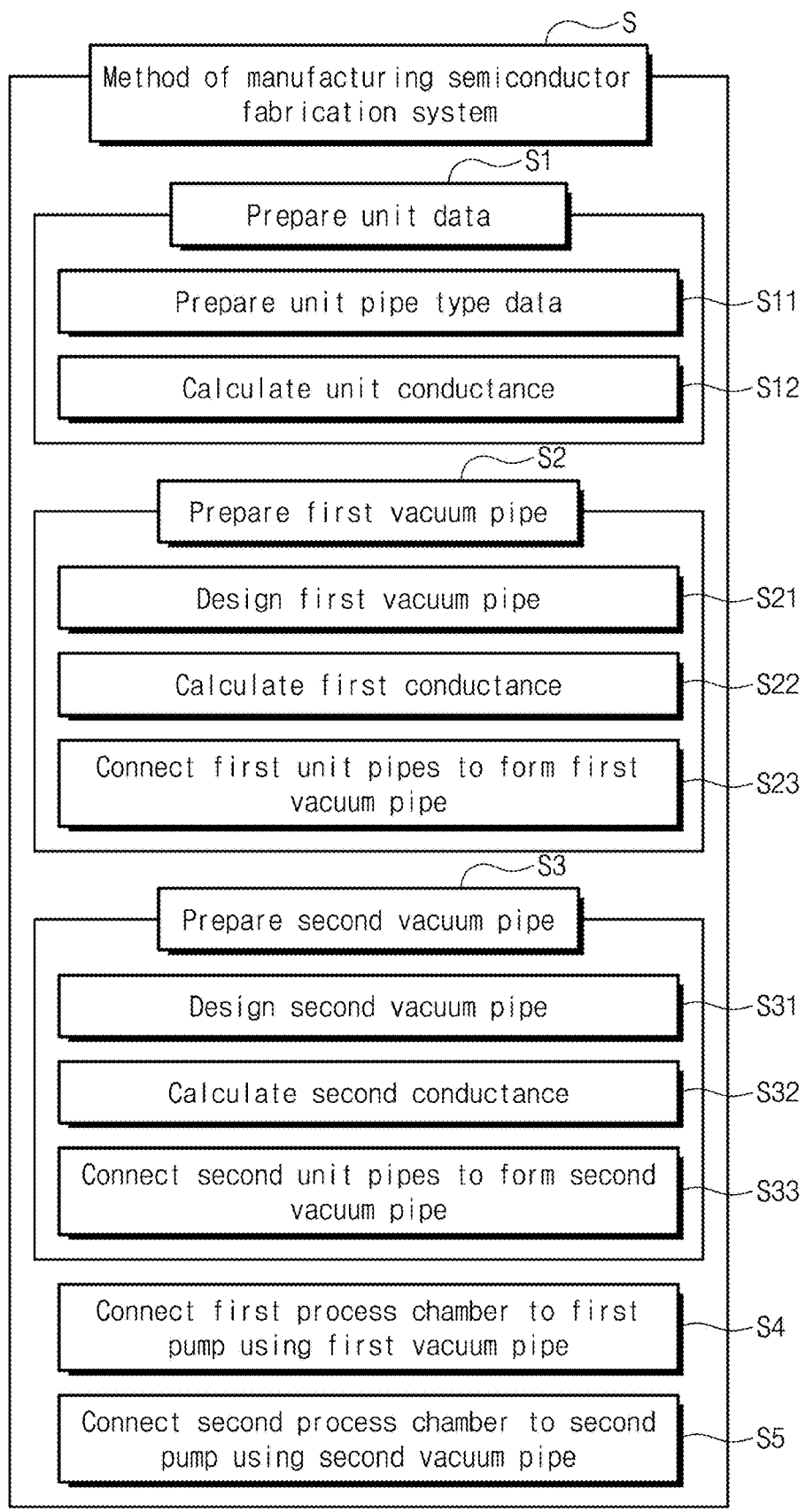
FIG. 9 is a flow chart illustrating a method of manufacturing a semiconductor fabrication system according to an embodiment of the inventive concept.

FIG. 9 is a flow chart illustrating a method of manufacturing a semiconductor fabrication system according to an embodiment of the inventive concept.

Referring to FIG. 9, a method S of manufacturing a semiconductor fabrication system may be provided. The manufacturing method S may be a method of manufacturing the semiconductor fabrication system described with reference to FIGS. 1 to 8. The manufacturing method S may include preparing unit data (in S1), preparing a first vacuum pipe (in S2), preparing a second vacuum pipe (in S3), connecting a first process chamber to a first pump using/through the first vacuum pipe (in S4), and connecting a second process chamber to a second pump using/through the second vacuum pipe (in S5).

The preparing of the unit data (in S1) may include preparing unit pipe type data (in S11) and calculating a unit conductance (in S12).

The preparing of the first vacuum pipe (in S2) may include designing the first vacuum pipe (in S21), calculating a first conductance (in S22), and connecting a plurality of first unit pipes to form the first vacuum pipe (in S23).

The preparing of the second vacuum pipe (in S3) may include designing the second vacuum pipe (in S31), calculating a second conductance (in S32), and connecting a plurality of second unit pipes to form the second vacuum pipe (in S33).

Hereinafter, the manufacturing method S of FIG. 9 will be described in more detail with reference to FIGS. 1 to 8 and 10.

FIG. 10 is a table showing unit data obtained during manufacturing a semiconductor fabrication system according to an embodiment of the inventive concept. For example, the unit data may be information of unit pipes including unit pipe types, sizes of the unit pipes, and fluid conductance of each of the unit pipes.

Referring to FIGS. 10, 4, 5, and 9, the preparing of the unit pipe type data (in S11) may include classifying the unit pipes 7 based on their types. For example, the unit pipes may be classified into straight pipes, elbow pipes, and reducer pipes. In the table of FIG. 10, the straight pipe is denoted by "Pipe". The elbow pipe is denoted by "Elbow". The reducer pipe is denoted by "Reducer". Data, which are prepared by classifying the unit pipes based on their types, may be referred to as unit pipe classification data UP. The preparing of the unit pipe type data (in S11) may further include preparing specification data on the unit pipes. For example, for the straight pipe, specification data on diameter and length may be prepared. For the elbow pipe, specification data on diameter and bending angle may be prepared. For the reducer pipe, specification data on first and second diameters may be prepared. The specification data on each unit pipe may be referred to as unit pipe specification data UPS. The unit pipe classification data UP and the unit pipe specification data UPS may be collectively referred to as unit pipe type data UPD.

In an embodiment, the unit pipe type data UPD may further include a shape data which is modeled using a 3D tool. For example, the unit pipe type data UPD may further include a 3D shape data, which is obtained through a modeling process using the 3D tool and contains information on a shape and a length of each unit pipe. When the unit pipe type data UPD includes the 3D shape data, an operation of obtaining the 3D shape data may be executed in advance. For example, the 3D shape data for each unit pipe may be created and stored. The unit pipe classification data UP and/or the unit pipe specification data UPS may be extracted from the 3D shape data. For example, the unit pipe classification data UP may be identified from the 3D shape data, which is visualized on a display device. In addition, the unit pipe specification data UPS may be obtained from the 3D shape data. By using this 3D shape data, it may be possible to obtain the unit pipe classification data UP and the unit pipe specification data UPS easily and quickly.

The calculating of the unit conductance (in S12) may include calculating a unit conductance UC, which is the conductance of each unit pipe. The unit conductance UC may be calculated using the specification data on each unit pipe. The unit conductance UC may be calculated for each unit pipe, which is separately classified in the unit pipe classification data UP. In the table of FIG. 10, the unit conductance UC of each unit pipe may be denoted by C1 to C8.

Referring back to FIGS. 5, 9, and 10, the designing of the first vacuum pipe (in S21) may include choosing a plurality of unit pipes, which are used to form the first vacuum pipe 21. For example, the unit pipes, which are used to form the first vacuum pipe, may be chosen, based on the unit pipe classification data UP of FIG. 10. During this step, a distance between the first pump 31 and the first process chamber 11 (e.g., see FIG. 1) may be taken into consideration. In addition, the disposition of neighboring elements may also be taken into consideration.

The calculating of the first conductance (in S22) may include calculating the first conductance, which is a total conductance of the designed first vacuum pipe 21. The calculating of the first conductance may be performed using the unit conductance of each of the unit pipes. For example, the first conductance may be calculated using the unit pipe type data UPD and the unit conductance UC. For example, in the case where a plurality of unit pipes are connected in series, the first conductance may be calculated, as follows:

$$\frac{1}{C_T} = \frac{1}{C_1} + \frac{1}{C_2} \cdots \frac{1}{C_N}$$

In the above equation, $C_T$ represents the first conductance, and each of $C_1, C_2, \ldots, C_N$ represent a unit conductance of a corresponding unit pipe. For example, the reciprocal number of the first conductance may be equal to a sum of values, each of which is given as a reciprocal number of a unit conductance of the corresponding unit pipe constituting the first vacuum pipe 21. The first conductance, which is the total conductance of the first vacuum pipe 21, may be calculated in this manner.

The connecting of the first unit pipes to form the first vacuum pipe (in S23) may include actually connecting a plurality of unit pipes to form the first vacuum pipe 21.

Referring back to FIGS. 4, 9, and 10, the designing of the second vacuum pipe (in S31) may include choosing a plurality of unit pipes, which are used as parts of the second vacuum pipe 22. The designing of the second vacuum pipe (in S31) may be similar to the designing of the first vacuum pipe (in S21). However, the number of the unit pipes constituting the second vacuum pipe may be different from the number of the unit pipes constituting the first vacuum pipe, and/or the types of the unit pipes constituting the second vacuum pipe may be different from the types of the unit pipes constituting the first vacuum pipe. For example, at least one of the unit pipes constituting the first vacuum pipe may have a different shape from each of the second unit pipes constituting the second vacuum pipe.

The calculating of the second conductance (in S32) may include calculating the second conductance, which is a total conductance of the designed second vacuum pipe 22. The calculating of the second conductance (in S32) may be similar to the calculating of the first conductance (in S22). However, the second conductance may be set to be equal to the first conductance. If the calculated second conductance is different from the previously-calculated first conductance, the designing of the second vacuum pipe (in S31) may be performed again. For example, the designing of the second vacuum pipe (in S31) may be performed such that the calculated second conductance is equal to the first conductance.

The connecting of the second unit pipes to form the second vacuum pipe (in S33) may include actually connecting a plurality of unit pipes to form the second vacuum pipe 22. Since, in the steps of S31 and S32, the second conductance is set to be equal to the first conductance, the total conductance in the final structure of the second vacuum pipe 22 may be equal to the total conductance of the first vacuum pipe 21. For example, the second vacuum pipe 22 may be formed such that the second conductance, which is the total conductance of the second vacuum pipe 22, becomes equal to the first conductance.

In an embodiment, a plurality of vacuum pipes may be formed by repeating the above steps.

Referring to FIGS. 9 and 1, the connecting of the first process chamber to the first pump using/through the first vacuum pipe (in S4) may include connecting the first process chamber 11 to the first pump 31 using/through the first vacuum pipe 21. Accordingly, the first process chamber 11 may be connected to the first pump 31. Referring to FIGS. 9 and 3, the connecting of the first process chamber to the first pump using/through the first vacuum pipe (in S4) may further include placing the first valve V1 on the first vacuum pipe 21. The first valve V1 may be a manual valve. In certain embodiments, the first valve V1 may be a passive valve and/or an automatic valve.

The connecting of the second process chamber to the second pump using/through the second vacuum pipe (in S5) may include connecting the second process chamber 12 to the second pump 32 using/through the second vacuum pipe 22. Accordingly, the second process chamber 12 may be connected to the second pump 32. Referring to FIGS. 9 and 3, the connecting of the second process chamber to the second pump using/through the second vacuum pipe (in S5) may further include placing the second valve V2 on the second vacuum pipe 22. The second valve V2 may be of the same type as the first valve V1.

So far, it has been described that the steps are sequentially performed, but the inventive concept is not limited thereto. For example, the order of the steps on the flow chart of FIG. 9 may be changed partially. For example, the connecting of the first unit pipes to form the first vacuum pipe (in S33) may be performed before the calculating of the first conductance (in S22).

Alternatively, some of the steps on the flow chart may be temporally overlapped (e.g., overlapped in time) with each other. For example, the designing of the second vacuum pipe (in S31) and the calculating of the second conductance (in S32) may be performed at substantially the same time.

In a method of manufacturing a semiconductor fabrication system according to an embodiment of the inventive concept, vacuum pipes may be provided to have the same conductance, and in this case, the process chambers may have the same exhausting performance. Thus, it may be possible to improve uniformity in process performance of the process chambers. For example, when the process chambers are used to perform the same process with the same recipe, the process performance of the process chambers may be uniformly controlled. Accordingly, it may be possible to prevent a result of a process, which is performed on a substrate, from being changed/varied from chamber to chamber. For example, it may be possible to reduce a process variation between the process chambers and thereby to improve a fabrication yield.

In a method of manufacturing a semiconductor fabrication system according to an embodiment of the inventive concept, it may be possible to easily control the valves, even when/after a process is repeated. For example, if a process is repeated, particles may be accumulated in the vacuum pipe. In this case, to maintain the conductance to a constant value, it may be necessary to further open the valve on the vacuum pipe. In the case where a plurality of vacuum pipes have the same conductance, all of the valves may be controlled in the same manner. Accordingly, even when/after the process is repeated, the controlling of the valve may be achieved quickly and simply.

In a method of manufacturing a semiconductor fabrication system according to an embodiment of the inventive concept, even when distances between process chambers and pumps vary (e.g., when the distances are different from each other), the conductance of the vacuum pipe may be maintained to the same value. This may increase a degree of freedom in disposing the process chamber and/or the pump.

In an embodiment, the conductance of the vacuum pipe may depend on temperature. For example, a change of the temperature may cause a change in the conductance of the vacuum pipe. Thus, the change of the temperature may be taken into consideration to improve the conductance uniformity of the vacuum pipes. For example, in the preparing of the second vacuum pipe (in S3), the second conductance may be calculated in consideration of an environment, in which the second vacuum pipe 22 is disposed. For example, if the first vacuum pipe 21 and the second vacuum pipe 22 are planned to be placed at different temperature conditions, the second conductance may be calculated in consideration of a temperature difference therebetween. Alternatively, a temperature adjusting device may be provided near the first vacuum pipe 21 and/or the second vacuum pipe 22 to diminish a temperature difference between the first vacuum pipe 21 and the second vacuum pipe 22 and/or to maintain a constant temperature of the vacuum pipes 21 and 22. For example, a conduit with circulating cooling water and/or a heating device (e.g., a heating wire) may be used as the temperature adjusting device.

In a method of manufacturing a semiconductor fabrication system according to an embodiment of the inventive concept, a temperature condition may be taken into consideration to improve the conductance uniformity of the vacuum pipes. Accordingly, even when one of the vacuum pipes is under a temperature condition different from the others, the process chambers may be operated with the same condition.

In a method of manufacturing a semiconductor fabrication system according to an embodiment of the inventive concept, it may be possible to improve uniformity in performance between a plurality of process chambers, which are used to perform the same process with the same recipe.

In a method of manufacturing a semiconductor fabrication system according to an embodiment of the inventive concept, it may be possible to easily control a plurality of process chamber.

In a method of manufacturing a semiconductor fabrication system according to an embodiment of the inventive concept, it may be possible to reduce a performance variation between process chambers and thereby to improve a fabrication yield of a semiconductor device.

In a method of manufacturing a semiconductor fabrication system according to an embodiment of the inventive concept, it may be possible to freely dispose a process chamber and/or a pump.

A method of manufacturing a semiconductor fabrication system is provided in the above description. According to an embodiment of the present disclosure, a semiconductor fabrication system is provided. The semiconductor fabrication system may be a system manufactured by the method of manufacturing the semiconductor fabrication system disclosed above. For example, the semiconductor fabrication system may include the chambers, the pumps and the vacuum pipes described above among other parts and components.

According to another embodiment of the present disclosure, a method of manufacturing a semiconductor device is provided. The method of manufacturing a semiconductor device may include providing a substrate (e.g., a semiconductor substrate) to a process chamber, depositing a layer on the substrate, patterning the substrate and/or a layer formed on the substrate (e.g., by a photolithography process), cleaning and drying the substrate. For example, conductor patterns, semiconductor patterns and/or insulating patterns/layers may be formed on the substrate. The substrate may be diced to be semiconductor chips and the semiconductor chips may be packaged to produce semiconductor devices. One or more steps of manufacturing processes of the semiconductor devices may be performed in the semiconductor fabrication system described above. For example, one or more etching processes patterning the semiconductor patterns, the conductor pattern and/or the insulating patterns may be performed in a processing chamber of the semiconductor fabrication system. One or more deposition processes forming metal layers, semiconductor layers and/or insulating layers may be performed in a chamber of the semiconductor fabrication system. One or more of cleaning processes of the substrate may be performed in a chamber of the semiconductor fabrication system. One or more exposure processes of photolithography processes may be performed in a chamber of the semiconductor fabrication system to form pattern on the substrate.

Though different figures show variations of exemplary embodiments and different embodiments discloses different features from each other, these figures and embodiments are not necessarily intended to be mutually exclusive from each other. Rather, as recognized from the context of the detailed description above, certain features depicted in different figures and/or described above in different embodiments can be combined with other features from other figures/embodiments to result in additional various embodiments, when taking the figures and related descriptions of embodiments as a whole into consideration.

While example embodiments of the inventive concept have been particularly shown and described, it will be understood by one of ordinary skill in the art that variations in form and detail may be made therein without departing from the spirit and scope of the attached claims.

What is claimed is:

1. A method of manufacturing a semiconductor fabrication system, comprising:
preparing a first vacuum pipe;
preparing a second vacuum pipe;

connecting a first process chamber to a first pump through the first vacuum pipe; and connecting a second process chamber, which is spaced apart from the first process chamber, to a second pump through the second vacuum pipe, wherein the preparing of the first vacuum pipe comprises:

connecting a plurality of first unit pipes to form the first vacuum pipe; and calculating a first conductance, which is a total conductance of the first vacuum pipe, wherein the preparing of the second vacuum pipe comprises forming the second vacuum pipe by connecting a plurality of second unit pipes such that a second conductance, which is a total conductance of the second vacuum pipe, is equal to the first conductance, and wherein a length of the first vacuum pipe is different from a length of the second vacuum pipe.

2. The method of claim 1, further comprising preparing unit data on the first unit pipes and the second unit pipes.

3. The method of claim 2, wherein the preparing of the unit data comprises preparing unit pipe type data, which are obtained by classifying the first and second unit pipes based on their types.

4. The method of claim 3, wherein the preparing of the unit data further comprises calculating a unit conductance of each of the first and second unit pipes.

5. The method of claim 4, wherein the calculating of the first conductance comprises calculating the first conductance, using the unit pipe type data and the unit conductance.

6. The method of claim 1, wherein the number of the first unit pipes constituting the first vacuum pipe is different from the number of the second unit pipes constituting the second vacuum pipe.

7. The method of claim 1, wherein at least one of the first unit pipes constituting the first vacuum pipe has a different shape from each of the second unit pipes constituting the second vacuum pipe.

8. The method of claim 1, wherein the first unit pipes comprise a straight pipe, an elbow pipe, and a reducer pipe.

9. A method of manufacturing a semiconductor fabrication system, comprising:

preparing a plurality of vacuum pipes; and connecting each of a plurality of process chambers to a corresponding one of a plurality of pumps through a corresponding one of the vacuum pipes, wherein the preparing of the vacuum pipes comprises calculating a conductance of each of the vacuum pipes, and all of the vacuum pipes have substantially the same conductance, and wherein at least one of the vacuum pipes has different shape from the others of the vacuum pipes.

10. The method of claim 9, wherein each of the process chambers comprises one of an etching chamber, a deposition chamber, and a substrate cleaning chamber.

11. The method of claim 10, wherein all of the process chambers are configured to perform the same semiconductor process.

12. The method of claim 9, wherein all of the pumps are configured to have the same output.

13. The method of claim 9, wherein the preparing of the vacuum pipes further comprises connecting a plurality of unit pipes to form each of the vacuum pipes, and the calculating of the conductance of each of the vacuum pipes is performed using a unit conductance of each of the unit pipes.

14. A method of manufacturing a semiconductor fabrication system, comprising:

preparing a first vacuum pipe;

preparing a second vacuum pipe, which is spaced apart from the first vacuum pipe and has a different shape from the first vacuum pipe;

connecting a first process chamber to a first pump through the first vacuum pipe; and connecting a second process chamber to a second pump through the second vacuum pipe, wherein the preparing of the first vacuum pipe comprises calculating a first conductance, which is a total conductance of the first vacuum pipe, the preparing of the second vacuum pipe comprises forming the second vacuum pipe such that a second conductance, which is a total conductance of the second vacuum pipe, is equal to the first conductance.

15. The method of claim 14, wherein a length of the first vacuum pipe is different from a length of the second vacuum pipe.

16. The method of claim 14, wherein the first process chamber and the second process chamber are spaced apart from each other by a first distance, and the first pump and the second pump are spaced apart from each other by a second distance different from the first distance.

17. The method of claim 16, wherein the second distance is smaller than the first distance.

18. The method of claim 14, wherein the connecting of the first process chamber to the first pump comprises placing a first valve on the first vacuum pipe, the connecting of the second process chamber to the second pump comprises placing a second valve on the second vacuum pipe, and the first and second valves are of the same type.

19. The method of claim 14, wherein the preparing of the first vacuum pipe further comprises connecting a plurality of first unit pipes to form the first vacuum pipe, and the calculating of the first conductance comprises calculating the first conductance, using a unit conductance of each of the first unit pipes.

* * * * *